United States Patent Office 3,576,911
Patented Apr. 27, 1971

3,576,911
SHOE SOLE COMPOUND
Frank S. Maxey, Akron, Ohio, assignor to The Goodyear Tire & Rubber Company, Akron, Ohio
No Drawing. Filed Mar. 27, 1969, Ser. No. 811,260
Int. Cl. C08f 33/08; C08g 39/10
U.S. Cl. 260—876      2 Claims

ABSTRACT OF THE DISCLOSURE

A polymeric material useful for shoe soling can be prepared by blending, e.g., on a heated mill: (I) 15 to 85 phr. (parts per hundred total resin) of styrene/butadiene/styrene (80/20 to 20/80 weight percent) block copolymer, (II) 20 to 80 phr. of styrene/butadiene (75/25 to 95/5 weight percent) copolymer resin, and (III) 10 to 90 phr. of ethylene/vinyl acetate (91/9 to 55/45 weight percent).

Styrene/isoprene block copolymers may be substittued in (I) and polyester resins in (III) above.

BACKGROUND

There is a need in the shoe industry for a low-cost composition soling compound which can be produced without the time-consuming, costly curing operation normally employed but still has the properties of a cured soling compound. The only compounds fitting this description which presently exist are vinyl, vinyl-nitrile rubber, and crepe rubber materials. Each has only limited special uses. The uncured material which is needed requires the characteristics of a high degree of toughness, high flexibility, and low cost. Attempts have been made to use styrene/butadiene block copolymers and high styrene resins, which have these desirable characteristics, but they have been unsuccessful because of cost and compounding incompatibility. Applicant has discovered that the addition of either ethylene/vinyl acetate resins or polyester resins permits the formation of smoothly blended compounds having the desired characteristics.

SYMBOLS AND DEFINITIONS

As employed in this specification and claims, the following symbols are employed to represent the meanings shown therewith:

S/B/S represents a styrene/butadiene/styrene block copolymer having a center segment of the polymer chain consisting of polybutadiene and both end portions consisting of polystyrene.

S/I/S represents a styrene/isoprene/styrene block copolymer having a center segment of the polymer chain consisting of polyisoprene and both end portions consisting of polystyrene.

S/B represents a copolymer of styrene and butadiene.

E/VA represents a copolymer of ethylene and vinyl acetate.

D.S.V. represents the dilute solution viscosity in toluene at 30° C.

$T_g$ represents the glass transition temperature.

PE represents an amorphous polyester resin prepared by reacting terephthalic or isophthalic acid and ethylene or diethylene glycol or tetramethylene glycol or mixtures of such acids and glycols.

INVENTION

Applicant has discovered a composition of material which meets the requirements for a tough, low-cost, highly flexible shoe soling material. It comprises a composition formed by mixing:

(I)

S/B/S block copolymer=15 to 85 phr.
S/B weight percent ratio=80/20 to 20/80 (preferred 30/70±5)
D.S.V.=0.5 to 2.4 (preferred 0.97)
or
S/I/S block copolymer=15 to 85 phr.
S/I weight percent ratio=80/20 to 20/80 (preferred 40/60±5)
D.S.V.=0.5 to 2.4 (preferred 1.40)
and (II)

S/B copolymer resin=20 to 80 phr.
S/B weight percent ratio=75/25 to 95/5 (preferred 85/15±3)
Refractive index=1.585 to 1.593 (preferred 1.587)
Heat distortion point (ASTM D648A)=75 to 120° F. (preferred 90° F.)
and (III)

E/VA copolymer resin=20 to 80 phr.
E/VA weight percent ratio=91/9 to 55/45 (preferred 81/19±3)
Melt index=0.7 to 2.5 (preferred 1.2)
or
PE resin=15 to 85 phr.
Glycol/acid weight percent=30/70 to 70/30
$T_g$=30 to 50° C.

MATERIALS AND PROCESSING

The manufacture and properties of the block copolymer useful as Component I in the practice of the invention are disclosed in U.S. Pats. 3,231,635, 3,265,765, and 3,333,024. These materials as well as Components II and III are available commercially.

The three components may be blended in any order and may be blended in conventional Banbury mixers or on a heated rubber mill. If on a mill, it is preferable to initiate milling with the component which is most difficult to mill. Ths is normally the resinous polymer requiring the highest temperature to soften.

Following mixing or milling, the compound is fed through an extruder and formed into sheets suitable for use in fabricating shoe soles. It has been found preferable to employ a roller head extruder for this application.

UTILITY

The compound of the invention is useful for fabricating shoe soles for use with either leather or composition uppers and they may be readily stitched or attached with a suitable adhesive to either type of shoe upper.

EXAMPLES

The practice of this invention is illustrated by reference to the following examples which are intended to be representative rather than restrictive of the scope of this invention.

Examples 1–4

Mixtures of each pair of the three components of the invention were attempted to be blended on a heated rubber mill at various temperatures. The results are contained in Table I. The compound of Example 1 was dry, crumbly, and poorly mixed even though the structural formula of the components would indicate their compatibility. The compounds of Examples 2 and 3, while not dry, were grainy with lumps of undispersed material. This result would be anticipated from the structural and chemical differences of these components. Efforts to facilitate blending by the conventional technique of adding stearic acid were unsuccessful. In Example 4, the compound of the invention produced a smooth, tough sheet without the presence of stearic acid.

soling compound. The results of these experiments are contained in Table III.

TABLE I

| Component | Example No. | | | |
|---|---|---|---|---|
| | 1 | 2 | 3 | 4 |
| Item I, S/B/S | 50.0 | 50.0 | | 50.0 |
| Item II, S/B | 50.0 | | 50.0 | 50.0 |
| Item III, E/VA | | 50.0 | 50.0 | 50.0 |
| Item IV, Stearic acid | 1.0 | 1.0 | 1.0 | |
| Milling temperature | 175–250° F | 175–250° F | 160–180° F | 175–250° F. |
| Milling behavior | Dry, batch crumbled and fell from mill rolls. Hard to form continuous band. | Grainy, lumpy, soft. Rather sticky. Weak. | Grainy, lumpy, soft. Rather sticky. Weak. | Good, smooth, tough sheet. No lumps or graininess present. |
| Hand tear | Poor | Poor | Poor | Excellent. |

Examples 5–8

Examples 5 through 8 demonstrate the beneficial effect of the compound of the invention when using a polyester as the third ingredient. Different commercially available S/B/S polymers were used in Examples 5 and 6 than were employed in Examples 6 and 7, but the effect of the addition of the polyester was the same in both instances. These examples also demonstrate that Whiting (CaCO₃) and process oil may be blended into the mixture without adversely affecting the beneficial result of the invention or detracting from the usefulness of the end product soling material. These results are shown in Table II.

TABLE II

| Component | Example No. | | | |
|---|---|---|---|---|
| | ¹5 | ²6 | ¹7 | ²8 |
| I (a) S/B/S ³ | 100.0 | 100.0 | 100.0 | 100.0 |
| I (b) S/B/S ⁴ | | | 60.0 | 60.0 |
| II S/B ⁵ | 60.0 | 60.0 | | |
| III PE ⁶ | | 10.0 | | 10.0 |
| IV Whiting (CaCO₃) | 60.0 | 60.0 | 60.0 | 60.0 |
| V Process Oil | 20.0 | 20.0 | 20.0 | 20.0 |
| Total | 240.0 | 250.0 | 240.0 | 250.0 |

¹ Could not mill. Batch crumbled and fell from mill rolls.
² Milled satisfactorily to form smooth, high strength compound.
³ 32% Styrene, D.S.V.=.96.
⁴ 35% Styrene, D.S.V.=1.46.
⁵ Styrene/Butadiene Resin=85/15.
⁶ Tetramethylene terephthalate polyester; $T_g$=38° C.

Examples 9–11

These examples demonstrate the improved processability of the compound of the invention over a compound containing only S/B/S and S/B when, in both instances, 50–150 parts of pigment and 20–30 parts of process oil have been added. The latter polymers blended poorly over a milling temperature range of 160–275° F. The addition of pigment and oil did not improve the milling characteristics of the two-component blend. The addition of E/VA which, though incompatible individually with the other two materials, provided the means of producing an easy milling, processable compound.

In compounding Example 9, the Component I was added to a mill roll set at 200° F. After a reasonably smooth band formed, Component II was added. Initially, some improvement was noticed, but this changed rapidly to the place where the batch became dry and crumbly and fell in pieces from the mill rolls. Raising the temperature to 275° F. did very little to improve the milling characteristics of this combination. Addition of the process oil at this temperature and at lower temperatures did not provide noticable improvement. Only the addition of Component III produced a smooth, tough, flexible sheet of useful

TABLE III

| Component | Example No. | | |
|---|---|---|---|
| | ¹9 | ¹10 | ²11 |
| I, S/B/S | 50 | 100 | 50 |
| II, S/B | 50 | 50 | 50 |
| III, E/VA | | | 50 |
| IV, Whiting (CaCO₃) | 60 | 150 | 60 |
| V, Process Oil | 20 | 30 | 20 |

¹ Could not mill satisfactorily. Very dry, fell off of mill.
² Milled very nicely. Formed smooth sheet. No dryness or roughness evident.

While certain representative embodiments and details have been shown for the purpose of illustrating the invention, it will be apparent to those skilled in the art that various changes and modifications may be made therein without departing from the spirit or scope of the invention.

What is claimed is:

1. A flexible resinous shoe sole composition comprising:
    (I) 15 to 85 phr. of a styrene/butadiene/styrene block copolymer having a center segment of the polymer chain consisting of polybutadiene and both end portions consisting of polystyrene, or a styrene/isoprene/styrene block copolymer having a center segment of the polymer chain consisting of polyisoprene and both end portions consisting of polystyrene, having a styrene to butadiene or styrene to isoprene weight percent ratio between 80/20 and 20/80, and a D.S.V. of between 0.5 and 2.4; and
    (II) 20 to 80 phr. of a styrene/butadiene copolymer resin, having a styrene to butadiene weight percent ratio between 75/25 and 95/5, a refractive index between 1.585 and 1.593, and a heat distortion point (ASTM D648A) between 75° F. and 120° F.; and
    (III) 20 to 80 phr. of an ethylene/vinyl acetate copolymer resin, having an ethylene to vinyl acetate weight percent ratio between 91/9 and 55/45, and a melt index between 0.7 and 2.5; or 20 to 80 phr. of an amorphous polyester resin prepared by reacting terephthalic or isophthalic acid and ethylene or diethylene glycol or tetramethylene glycol or mixtures of such acids and glycols, having an acid/glycol weight percent ratio between 30/70 and 70/30, and a $T_g$ of between 30 and 50° C.

2. The composition of claim 1 wherein
Component I is a styrene/butadiene/styrene block copolymer having a styrene to butadiene weight percent ratio of 30/70±5 and a D.S.V. of about 0.97;
Component II has a styrene to butadiene weight percent ratio of 85/15±3, a refractive index of 1.587, and a heat distortion point of 90° F.; and Component III is ethylene/vinyl acetate having an ethylene to vinyl acetate weight percent ratio of 81/19±3 and a melt index of about 1.2.

References Cited
UNITED STATES PATENTS
3,424,649  1/1969  Nyberg et al. _____ 260—876

FOREIGN PATENTS
686,721  5/1964  Canada _____ 260—876

SAMUEL H. BLECH, Primary Examiner

U.S. Cl. X.R.
260—23.7, 41.5, 873, 889

Dedication 3,576,911.—*Frank S. Maxey*, Akron, Ohio. SHOE SOLE COMPOUND. Patent dated Apr. 27, 1971. Dedication filed Dec. 20, 1971, by the assignee, *The Goodyear Tire & Rubber Company*.

Hereby dedicates to the People of the United States the entire term of said patent.

[*Official Gazette July 18, 1972.*]